United States Patent [19]

Johnson et al.

[11] Patent Number: 5,370,770

[45] Date of Patent: Dec. 6, 1994

[54] METHOD FOR DEINKING PRINTED WASTE PAPER USING SOYBEAN PEROXIDASE

[75] Inventors: Mark A. Johnson, Chillicothe; Alexander R. Pokora, Pickerington, both of Ohio

[73] Assignee: The Mead Corporation, Dayton, Ohio

[21] Appl. No.: 973,725

[22] Filed: Nov. 9, 1992

[51] Int. Cl.$^5$ ............................................. D21C 5/02
[52] U.S. Cl. ..................................... 162/6; 162/5; 162/72; 162/78; 162/99; 435/278
[58] Field of Search ............... 162/5, 6, 72, 72 B, 162/78, 99; 435/277, 278

[56] References Cited

U.S. PATENT DOCUMENTS

| | | | |
|---|---|---|---|
| 3,966,543 | 6/1976 | Cayle et al. | 162/158 |
| 4,011,389 | 3/1977 | Langdon | 536/4.1 |
| 4,191,610 | 3/1980 | Prior | 162/147 |
| 4,276,118 | 6/1981 | Quick | 162/5 |
| 4,297,322 | 10/1981 | Liu | 422/184 |
| 4,298,652 | 11/1981 | Suzuki et al. | 428/323 |
| 4,304,649 | 12/1981 | Han et al. | 204/160 |
| 4,310,356 | 1/1982 | Trubiano et al. | 106/25 |
| 4,379,844 | 4/1983 | Young | 435/251 |
| 4,381,969 | 5/1983 | DeCeuster et al. | 162/6 |
| 4,447,530 | 5/1984 | Young | 435/68 |
| 4,561,933 | 12/1985 | Wood et al. | 162/5 |
| 4,599,190 | 7/1986 | Maloney | 252/174 |
| 4,687,745 | 8/1987 | Farrell | 162/72 B |
| 4,690,895 | 9/1987 | Farrell | 162/72 B |
| 4,735,682 | 4/1988 | Didwania et al. | 162/8 |
| 4,820,379 | 4/1989 | Darlington | 162/5 |
| 4,908,240 | 3/1990 | Auhorn et al. | 467/391 |
| 4,923,565 | 5/1990 | Fuentes et al. | 162/72 |
| 5,004,664 | 4/1991 | Fuller et al. | 430/106.6 |
| 5,068,009 | 11/1991 | Jokinen et al. | 162/9 |
| 5,094,716 | 3/1992 | Letscher | 162/7 |
| 5,102,500 | 4/1992 | Darlington | 162/5 |
| 5,147,793 | 9/1992 | Johnson et al. | 162/72 B |
| 5,178,762 | 1/1993 | Pokora et al. | 162/72 |

FOREIGN PATENT DOCUMENTS

| | | | |
|---|---|---|---|
| 2078346 | 9/1991 | Canada | 162/5 |
| 447672 | 9/1991 | European Pat. Off. | |
| 3028992 | 2/1988 | Japan | 162/5 |
| 2080683 | 3/1990 | Japan | |
| 2080684 | 3/1990 | Japan | |
| 2160984 | 6/1990 | Japan | |

OTHER PUBLICATIONS

"Enzyme Technology For Fiber Treatment" T. Jefferies, pp. 43–49.

"Business & Technology News", Tappi Journal, p. 48 (Bleaching and Pulping Research) May (1989).

"The Deinking Process" Paper and Timber, 73, pp. 923–927, (1991): 10.

*Primary Examiner*—Karen M. Hastings
*Attorney, Agent, or Firm*—Thompson, Hine & Flory

[57] ABSTRACT

A method of deinking printed waste paper for recycle which comprises converting a printed waste paper to a fibrous pulp in an aqueous medium to form a fibrous pulp slurry; contacting the slurry with a soybean peroxidase and a peroxide to deink the pulp; separating the deinked pulp from the aqueous medium; and recovering the deinked pulp.

17 Claims, No Drawings

METHOD FOR DEINKING PRINTED WASTE PAPER USING SOYBEAN PEROXIDASE

BACKGROUND OF THE INVENTION

1. Field of the Invention

The present invention relates to a method for deinking printed waste paper using a peroxidase in the presence of a peroxide as the deinking agent. In accordance with the preferred embodiment of the invention, the enzyme is soybean peroxidase.

2. Description of the Prior Art

The recycling and use of waste paper has been dramatically influenced in recent years by public presence and by existing and pending government legislation. With the utilization of waste paper expected to continually increase in the future, the recycling of waste paper is believed to be one of the main issues facing the paper industry in the next decade and beyond.

Waste paper is most often used in the production of lower quality commodity grades such as linerboard, newsprint, etc. Recent advances in recycling technology, particularly, with respect to the deinking of printed waste papers allows the recycled pulp to be used in the production of higher grades of paper such as bond paper, etc. In the past, most papers were printed using primarily water or oil-based inks which are satisfactorily removed by conventional deinking methods which includes forming an aqueous pulp and contacting the pulp with a surfactant. The ink is separated from the pulp fiber and the ink is then subsequently removed by washing or floatation procedures. For example, the use of a substituted oxyethylene glycol nonionic surfactant along with a low molecular weight polyelectrolyte for deinking secondary fiber is described in U.S. Pat. No. 4,599,190 to Maloney. Betscher, U.S. Pat. No. 5,094,716 describes an improvement in the process for deinking groundwood newsprint wherein a combination of certain anionic surfactants in conjunction with a defoamer and a naphthalene-formaldehyde condensate is employed. Oil-based inks are generally saponified or dispersed under alkaline conditions and are thus broken up releasing the ink which can then be easily removed by any satisfactory means. There is, however, an increased use of electrostatic inks employed in printed matter such as xerography, etc. and these inks are much more difficult to remove than the common water or oil-based inks. As a result, waste paper produced from electrostatic ink-printed paper has a higher dirt count making for a lower grade product.

The removal of electrostatic inks and toners from xerographically printed waste paper has been described for example in U.S. Pat. No. 4,561,733 to Wood, U.S. Pat. No. 4,276,118 to Quick; U.S. Pat. No. 4,820,379 and U.S. Pat. No. 5,102,500 both to Darlington. While such attempts have been successful in removing most of the electrostatic inks or toners, generally some large agglomerates remain in the processed fiber giving it an undesirable appearance, particularly, when used in high quality paper.

Enzymes have been used in the treatment of paper pulps and for purifying the waste water effluents from paper mill operations. According to a 1991 article, "Enzyme Technology for Fiber Treatment" by T. W. Jefferies of the Institute for Microbial and Biochemistry Technology, USDA Forest products, Madison, Wis., lipases are presently being applied to pitch removal and deinking in lignocellulose bioprocesses. Japanese Pat. Nos. JP 2160984 and JP 2080684 describe the use of the enzyme, lipase, in the hydrolysis of soya-based inks. This enzyme, however, has no apparent effect on mineral-based inks. Another enzyme, cellulase, has been described in Japanese patent No. JP 2080683 where cellulase in combination with a surfactant may improve certain deinking processes. It is anticipated that such deinking would be advantageous in processes where fibers other than cellulosic fibers are used since it is known that cellulase is likely to damage cellulose fibers. European patent application No. EP 447672 describes deinking waste paper using a lignolytic enzyme. According to the European application, oxidation potential of the enzyme is critical to the deinking process.

SUMMARY OF THE INVENTION

The present invention provides a method for deinking printed waste paper which not only overcomes the problems previously associated with deinking procedures, but it also has the advantage of being extremely attractive economically.

In accordance with a preferred embodiment of the invention, an aqueous slurry of the printed waste paper pulp fiber is contacted with soybean peroxidase and a peroxide whereby the fibrous pulp is deinked. The deinked fibrous pulp is separated from the aqueous medium and recovered for reuse. The recycled fiber is useful in the production of high quality fine papers such as bond paper, etc.

DETAILED DESCRIPTION OF THE INVENTION

As described herein, it has been discovered that newsprint such as newspapers, magazines, etc. can be reclaimed as secondary fiber for use in the production of high quality fine paper for printing and writing by treating an aqueous slurry of pulped newsprint with a peroxidase enzyme and a peroxide such as hydrogen peroxide. Preferably the original newsprint contains up to about 5% moisture.

Any of a variety of peroxidases can be used in the present invention. Soybean peroxidase is preferred because tests have shown that it is more reactive and that it is more chemically and thermally resistant than other peroxidases. Furthermore, soybean peroxidase (SBP) exhibits a higher redox potential than some other enzymes such as horseradish peroxidase (HRP) as shown in Table 1:

TABLE 1

Redox Potential of Soybean Peroxidase (SBP) vs. Horseradish Peroxidase (HRP)

| Substrate ($\lambda_{max}$) | $E_{\frac{1}{2}}$ (V) | SBP* | HRP* |
| --- | --- | --- | --- |
| pentamethoxybenzene (300 nm) | 1.07 | 8.76 | 2.50 |
| 1,2,3,5-tetramethoxybenzene (295 nm) | 1.09 | 3.02 | 0.30 |
| 1,2,4-trimethoxybenzene (450 nm) | 1.12 | 9.23 | 1.64 |
| hexamethoxybenzene (425 nm) | 1.24 | 0.22 | 0 |
| 1,4-dimethoxybenzene (315 nm) | 1.34 | 0.072** | 0 |

*all values in $\Delta$ Abs/(mg enzyme-min).
**curve of $\Delta$Abs/time slopes upward as reaction proceeds.

Although soybean peroxide is preferred, the invention is also open to the use of peroxidases such as peroxidases from other legumes, horseradish peroxidase, rice peroxidase and peroxidases from malvaceous plants such as cotton.

The aqueous slurry of the printed waste paper pulp fibers may be treated with the peroxidase in the form of a plant extract or, in the case of soybean peroxidase, the soybean seed hulls may be employed directly. In the deinking process, the peroxidase may be extracted from the hulls or, because the soybean seed hulls are composed of cellulosic fibers similar to the cellulosic fibers of paper, it may not be necessary to separate the hulls from the papers. Not only is the method simplified by using the soybean seed hulls as the source of soybean peroxidase but the seed hull fibers may become a useful part of the reclaimed paper to significantly improve the yield of secondary fiber.

The amount of peroxidase is not particularly critical provided that adequate enzyme is employed to sufficiently deink the fibers. The amount of enzyme used will depend upon its activity and its stability under the conditions of the deinking operation. While the enzyme is not consumed in the reaction, it gradually loses activity. Typically, the amount of soybean peroxidase used will be in the range of about 0.01 to 20 units of soybean peroxidase per gram of dry pulp in the slurry. A "unit" of soybean peroxidase as used in this application means the amount of peroxidase which produces a change of 12 absorbance units measured at 1 cm pathlength in one minute at 420 nm when added to a solution containing 100 mM potassium phosphate, 44 mM pyrogallol and 8 mM hydrogen peroxide, and having a pH of 6 (Sigma Chemical Co., Peroxidase Bulletin).

The peroxides useful in this invention are those commonly used in conjunction with peroxidase enzymes. Hydrogen peroxide is generally preferred, but any of the water soluble peroxides such as methyl peroxide, ethyl peroxide, etc. may also be useful.

The peroxide may be reacted neat or in a solution. The preferred peroxide, hydrogen peroxide, is typically dissolved in water in which the concentration of hydrogen peroxide may range from about 0.1 mM to 1M, and preferably from about 2 mM to 5 mM. The solution of hydrogen peroxide is generally added dropwise to the pulp slurry containing the soybean peroxidase over a period of time which will vary with deinking conditions such as temperature and mixing speed. An excess of peroxide can inhibit the deinking reaction. Accordingly, it is desirable to control the rate of addition of the peroxide to maximize the efficiency of the deinking process without inhibiting the reaction. In accordance with one embodiment of the invention, the peroxide is initially reacted at a rate of approximately twice the average reaction rate and thereafter the rate of addition of the peroxide is adjusted downwardly to compensate for the decrease in the rate of reaction. Typically, the rate of addition of the peroxide is controlled such that the peroxide concentrate does not exceed about 23 millimolar and more preferably does not exceed 2 to 5 millimolar.

The fibrous pulp slurry may be treated with the soybean peroxidase at a temperature up to about 90° C. or higher. The treatment is preferably conducted at a temperature in the range of about 25° to 90° C.

While it is in the scope of this invention to conduct the treatment of printed waste paper pulp with the soybean peroxidase and peroxide at a pH of about 1 to 13, it is preferred that the treatment be conducted at a pH of about 4 to 9. The pH is adjusted by the addition of acid or base.

In order to facilitate the deinking of the fibers, it may be desirable to employ a co-solvent in the reaction medium. The co-solvent is typically an organic solvent and, preferably, a water miscible or water immiscible organic solvent. Co-solvents which are useful in this invention include but are not limited to water immiscible solvents such as hexane, trichloromethane, methyl ethyl ketone, ethyl acetate, and butanol; and water miscible solvents such as ethanol, methanol, isopropanol, dioxane, tetrahydrofuran, dimethyl formamide, methyl formate, acetone, n-propanol, t-butyl alcohol. The amount and type of co-solvent employed will depend on various factors such as the nature of the coating on the paper and the type and/or amount of ink to be removed from the fibers. It is expected that the ratio of the amount of co-solvent to the amount of water by volume will be in the range of about 1:10 to 10:1. However, to minimize solvent recovery preferably the ratio will not exceed 1:2 and still more preferably it will not exceed 1:4.

While not desiring to be bound by any particular theory, it is believed that the deinking of the fibrous pulp in accordance with this invention involves an oxidation reaction in which the peroxidase in combination with the peroxide enzymatically oxidizes at least a portion of the ink to a colorless form with or without removal of the ink. It is further believed that oxidation may occur in ink carriers rather than the pigment so that mineral pigments containing oxidizable carriers or binders may be susceptible to the present invention.

Physical removal of ink, whether it be colored or noncolored, may be achieved by the action of one or more additional conventional deinking agents. These additives loosen the ink from the fiber so that it can easily be removed and separated from the fiber. Additives which are useful in the present invention include agents which are known to be effective in such reactions and include, e.g., detergents such as nonionic surfactants, ethoxylated linear alcohols, ethoxylated alkyl phenols, or other chemicals such as caustic to swell the fibers and chelators such as phosphates to remove metals.

Other agents which are commonly used in deinking operations such as surfactants, bleaches, brighteners, softeners, defoamers, dispressants, chelating agents and the like may also be useful in this invention for their conventional purpose.

Removal of the inks from the slurry is otherwise achieved in a conventional manner. Ink can be separated from the fibers once the bond between fiber and ink is broken. In a washing procedure, the ink particles are finely dispersed using dispersants and surfactants and the fibers are filtered or sedimented out of solution. In a flotation procedure, ink particles are agglomerated and carried to the surface adhered to air bubbles of a foam. The foam containing the ink is then skimmed off leaving the fiber free of ink.

It is, of course, to be understood that the method of the present invention may be practiced batchwise or continuously. The invention is further illustrated, but not limited by the following examples.

EXAMPLE I

Ground untoasted soybean seed hulls obtained from Central Soya, Marion, Ohio, were stirred in tap water at a ratio of 50 pounds of hulls per 100 gallons of water. The mixture was stirred in a Cowles mixer at 1000 rpm for 15 minutes. The mixture was filtered on a 0.002" screen (Sweco 34TBC), allowed to settle for 1 day, and then concentrated twenty-fold by ultrafiltration on a 30,000 molecular weight cut off polysulfone membrane. The concentrate was used as the source of soybean peroxidase in the following examples.

EXAMPLE II

A newspaper (Mar. 15, 1992 edition of the Columbus Dispatch) was cut into 2 inch squares and homogenized in tap water at a ratio of 190 grams of paper in 4 liters of water using a Waring blender. 307 grams of pulp/water mixture was mixed with 36 ml isopropanol, 485 ml tap water, and 55 ml of the soybean seed hull extract obtained in Example I. The pulp/isopropanol/soybean seed hull extract was poured into a jacketed round bottom flask and stirred at 300 rpm at 60° C. 5 ml of a 15% $H_2O_2$ solution and added to the pulp/extract solution at 60° C. and 300 rmp over 5 minutes. At the end of the reaction, the mixture was filtered on a Whatman #4 filter paper by vacuum filtration and the damp pulp was separated from the filter.

EXAMPLE III

Example II was repeated except that prior to reaction the soybean extract was placed in a 250 ml Erlenmeyer flask and heated on a steam bath for 20 minutes to destroy enzymatic activity. Otherwise, the reaction was the same as Example II.

EXAMPLE IV

Example II was repeated using fresh extract, but without hydrogen peroxide.

The results of Examples II-IV are shown in Table 2.

TABLE 2

| ENZYMATIC DEINKING OF NEWSPRINT | | |
| --- | --- | --- |
| Example | Observed Color | % Black |
| II | Light Tan | +½ |
| III (Boiled Enzyme) | Gray-black | +2 |
| IV (No Peroxide) | Gray-black | +2 |

[1]—Visual % Black Scale (0–10)

A direct assay of peroxidase in the aqueous fraction of each reaction using 1,4-dimethoxybenzene as a substrate indicates that heating reduces the oxidation potential of the peroxidase as shown in Table 2.

TABLE 3

| PEROXIDASE ACTIVITY OF DEINKING REACTIONS[2] | | | |
| --- | --- | --- | --- |
| Fraction | Ex. II | Ex. III | Ex. IV |
| Zero time | 1.22 | 0.94 | ND[3] |
| 5 ml $H_2O_2$/5 min. | 0.16 | 0.23 | ND[3] |
| Filtrate After Reaction | 0.06 | 0.22 | 2.43 |

[2]—Units/ml
[3]—ND means not done

Table 3 indicates that heating at 60° C. did not destroy peroxidase and that high levels of activity were present in each reaction, but that more vigorous heating, by placing the peroxidase directly in a 100° C. stream of steam, completely destroyed peroxidase activity.

In conclusion, both an active enzyme and hydrogen peroxide are required to deink newsprint using soybean seed hull extract. The mechanism may include perhydrolysis by a lipase and peroxide or oxidative bleaching by soybean lipoxygenase or other peroxidase.

It will be obvious to those skilled in the art that various changes can be made without departing from the scope of the invention and the invention is not to be considered limited to what is described in the specification.

What is claimed is:

1. A method for deinking printed waste paper in the course of reclaiming the fiber content of said paper for reuse which comprises preparing a fibrous pulp slurry of said printed waste paper in an aqueous medium, treating said slurry with soybean peroxidase enzyme in an amount sufficient to deink said printed waste paper, and a peroxide.

2. The method of claim 1 wherein said slurry is treated with about 0.01 to 20 units of soybean peroxidase per gram of dry pulp in said slurry based on the amount of said printed waste paper.

3. The method of claim 2 wherein said printed waste paper contains up to about 5% moisture as originally obtained.

4. The method of claim 2 wherein said slurry is treated with an aqueous solution of about 2 mM to 5 mM hydrogen peroxide.

5. The method of claim 4 wherein said treatment is conducted at a temperature up to about 90° C. and a pH of about 1 to 13.

6. The method of claim 5 wherein said temperature is about 10° to 70° C. and said pH is about 4 to 9.

7. The method of claim 1 wherein said treatment is conducted in the presence of a water-immiscible or a water-miscible co-solvent.

8. The method of claim 7 wherein said treatment is carried out in the presence of a water-immiscible solvent selected from the group consisting of hexane, trichloromethane, methyl ethyl ketone, ethyl acetate and butanol.

9. The method of claim 7 wherein said treatment is carried out in the presence of a water-miscible solvent selected from the group consisting of ethanol, methanol, n-propanol, isopropanol, t-butanol, tetrahydrofuran, dimethyl formamide, methyl formate, acetone, and dioxane.

10. The method of claim 1 wherein said slurry is treated with ground soybean seed hulls as a source of said soybean peroxidase.

11. The method of claim 10 wherein said slurry is treated with ground soybean seed hulls in an amount sufficient to provide about 0.01 to 20 units of said soybean peroxidase per gram of dry pulp in said slurry.

12. The method of claim 10 wherein said ground soybean seed hulls are not separated from said pulp and become a part of the reclaimed paper.

13. The method of claim 1 wherein said deinked fibrous pulp is separated from said aqueous medium.

14. The method of claim 13 wherein said pulp is separated from said aqueous medium by filtration, centrifugation or sedimentation.

15. The method of claim 14 wherein said pulp is separated from said aqueous medium by filtration.

16. The method of claim 1 wherein at least a portion of said ink is oxidized to a colorless form with or without removal of said ink from said fibrous pulp.

17. The method of claim 16 wherein the ink is physically removed from said fibrous pulp.

* * * * *